United States Patent
Burka (10) Patent No.: US 10,071,780 B1
(45) Date of Patent: Sep. 11, 2018

(54) STABILIZED TWO-WHEELED TRAILER

(71) Applicant: Eric S. Burka, Ballwin, MO (US)

(72) Inventor: Eric S. Burka, Ballwin, MO (US)

( * ) Notice: Subject to any disclaimer, the term of this patent is extended or adjusted under 35 U.S.C. 154(b) by 565 days.

(21) Appl. No.: 14/567,356

(22) Filed: Dec. 11, 2014

(51) Int. Cl.
*B62D 63/00* (2006.01)
*B60G 11/02* (2006.01)
*B60G 11/04* (2006.01)
*B62D 63/06* (2006.01)
*B60G 9/02* (2006.01)

(52) U.S. Cl.
CPC ............. *B62D 63/062* (2013.01); *B60G 9/02* (2013.01); *B60G 11/02* (2013.01)

(58) Field of Classification Search
CPC ...... B60G 9/003; B60G 11/10; B60G 11/107; B60G 11/113; B60G 11/104; B60G 2202/112; B60G 2202/121; B60G 2202/04; B60G 11/04; B60G 2204/121; B60G 11/02; B60G 3/14; B60G 3/145; B62D 63/062
USPC ..... 280/656, 65, 66, 67, 492, 493, 494, 709, 280/124.116, 124.128, 124.17, 124.175, 280/124.176, 124.131, 789
See application file for complete search history.

(56) References Cited

U.S. PATENT DOCUMENTS

| | | | |
|---|---|---|---|
| 2,117,401 A * | 5/1938 | Cobb | B60G 11/04 267/242 |
| 2,465,065 A | 3/1949 | Conrad et al. | |
| 2,551,136 A | 5/1951 | Keltner | |
| 2,779,607 A | 1/1957 | Milhizer | |
| 2,871,030 A | 1/1959 | Hollis | |
| 3,282,603 A * | 11/1966 | Barth | B62D 25/2054 280/789 |
| 3,387,853 A * | 6/1968 | Sueoka | B60P 3/32 280/166 |
| 3,552,775 A | 1/1971 | Warner | |
| 3,730,557 A | 5/1973 | Cox | |
| 3,797,850 A * | 3/1974 | Stout | B62D 63/08 105/397 |
| 3,891,231 A * | 6/1975 | Snoberger | B60G 11/04 267/271 |
| 4,200,306 A | 4/1980 | Helms | |
| 4,225,152 A | 9/1980 | Eaton | |
| 4,548,423 A | 10/1985 | Craven et al. | |
| 4,711,461 A | 12/1987 | Fromberg et al. | |
| 4,819,956 A * | 4/1989 | Campbell | B62K 27/003 280/203 |
| 5,186,483 A | 2/1993 | Sheppard et al. | |
| D357,888 S * | 5/1995 | Geddes | D12/101 |
| 5,630,693 A * | 5/1997 | Sobina | B60G 3/14 414/495 |
| 5,647,604 A | 7/1997 | Russell et al. | |
| 5,810,544 A * | 9/1998 | Wellman | B60P 3/122 280/124.128 |
| 5,873,595 A | 2/1999 | Hinte et al. | |
| 5,984,342 A | 11/1999 | Ysker et al. | |

(Continued)

*Primary Examiner* — Anne Marie M Boehler
(74) *Attorney, Agent, or Firm* — Grace J. Fishel (57) ABSTRACT

A narrow gauge two-wheeled trailer mounted on spaced apart elongated beams and split axles is stabilized against rolling or tilting about the longitudinal axis with a leaf spring suspension and a universal joint coupling. The split axles are mounted on an axle arms pivoted to the beams and supported by leaf springs configured to lengthen or shorten along the beams. The universal joint coupling permits pitch and yaw movement of the trailer but resists rolling.

6 Claims, 13 Drawing Sheets

(56) References Cited

U.S. PATENT DOCUMENTS

| | | | |
|---|---|---|---|
| 7,125,031 B1 | 10/2006 | Schoonover | |
| 7,744,111 B2 | 6/2010 | Anderson | |
| 7,938,431 B1 | 5/2011 | Snyder | |
| 8,226,098 B2 | 7/2012 | VanDenberg et al. | |
| 8,465,036 B2 * | 6/2013 | Power | B60G 9/003 |
| | | | 280/124.116 |
| D693,746 S * | 11/2013 | Roeber | D12/162 |
| 8,662,525 B1 * | 3/2014 | Dierks | B62B 1/00 |
| | | | 280/142 |
| 8,708,085 B1 | 4/2014 | Wilson | |
| 8,857,848 B2 | 10/2014 | Lomas et al. | |
| 9,440,576 B1 * | 9/2016 | Wierzba | B60P 3/08 |
| 2005/0285362 A1 | 12/2005 | Williamson | |
| 2006/0185912 A1 | 8/2006 | Bullis | |
| 2010/0225092 A1 | 9/2010 | Hudson | |

* cited by examiner

STABILIZED TWO-WHEELED TRAILER

BACKGROUND OF THE INVENTION

1. Field of the Invention

The present invention relates to a narrow gauge low profile two-wheeled trailer stabilized against rolling or tilting about the longitudinal axis with a leaf spring suspension and a universal joint hitch coupling.

2. Brief Description of the Prior Art

Light weight vehicle trailers are almost universally provided with at least two laterally spaced wheels in order to provide lateral stability. Further stability is provided by a hitch connection to the towing vehicle, thus defining three points of stability for the trailer (the two wheels and the hitch). As the trailer must articulate behind the towing vehicle, a ball-type trailer hitch is generally used for most light capacity trailers. Ball hitches provide three degrees of angular freedom between the towing vehicle and trailer, i.e., pitch, yaw and roll and with a wheel base of 36" to 50" rolling is not a big problem.

A variety of wide trailers are available for hauling motorcycles, including flat bed utility trailers and elaborate "fold-up" or "take-apart trailers." A major problem with the "take-apart" units is that they do not have a suspension so that all road shock is transferred into the motorcycle suspension and tie downs. The "fold-up" types are garage space hogs and when not folded up take up even more space.

Rolling becomes a problem when a two-wheel trailer is made narrow, e.g. 24 inches wide, as the laterally spaced wheels are insufficient to prevent rolling movement about the longitudinal axis. This has been addressed with narrow trailers in the past by replacing the ball-type hitch with a two axis hitch assembly. On turns, however, the hitch assembly may not exert enough force to keep the center of gravity of a tall load from falling outside the contact point of the wheels. This is because the torque stability force provided by the two axis hitch assembly is reduced as the pitch axis of the hitch aligns with the longitudinal axis of the trailer. Hence for a narrow gauge two-wheel trailer additional stabilization against lateral rolling or tilting is needed when the trailer is used for hauling a tall load with a high center of gravity such as a motorcycle.

BRIEF SUMMARY OF THE INVENTION

In view of the above, it is an object of the present invention to provide a stabilized narrow gauge low profile two-wheeled trailer. Other objects and features of the invention will be in part apparent and in part pointed out hereinafter.

In accordance with the invention a narrow gauge, stabilized two-wheeled trailer has a frame with first and second elongate beams. An axle of a first wheel is mounted on a first axle arm pivoted to the first elongate beam and an axle of a second wheel is mounted on a second axle arm pivoted to the second elongate beam. Each of the axles are supported on a leaf spring mounted on the first and second elongate beams and each leaf spring is configured to lengthen or shorten according to load variations as the axles move up and down along an arc while lateral roll forces on the trailer are resisted by the axle arms.

In other embodiments, the leaf spring suspension described above is combined with a universal joint coupling having a first tubular section with a yoke formed by a pair of spaced apart pivot ears at a first end and a second end adapted to be removably coupled to a second receiver secured to a frame of a pulling vehicle, a second tubular section with a yoke formed by a pair of spaced apart pivot ears at a first end and a second end adapted to be removably coupled to the receiver in the tongue. A block joins the yokes of first tubular section with the yokes of second tubular section with a first generally horizontal pin in the pivot ears of the first tubular section transverse to a longitudinal axis of the universal joint coupling and a second generally vertical pin in the pivot ears of the second tubular section perpendicular to the longitudinal axis of the universal joint coupling. The leaf spring suspension and the universal joint coupling act in concert to resist lateral roll forces on the trailer while the first and second yokes in the universal joint coupling permit pitch and yaw annular freedom between a pulling vehicle and the trailer.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
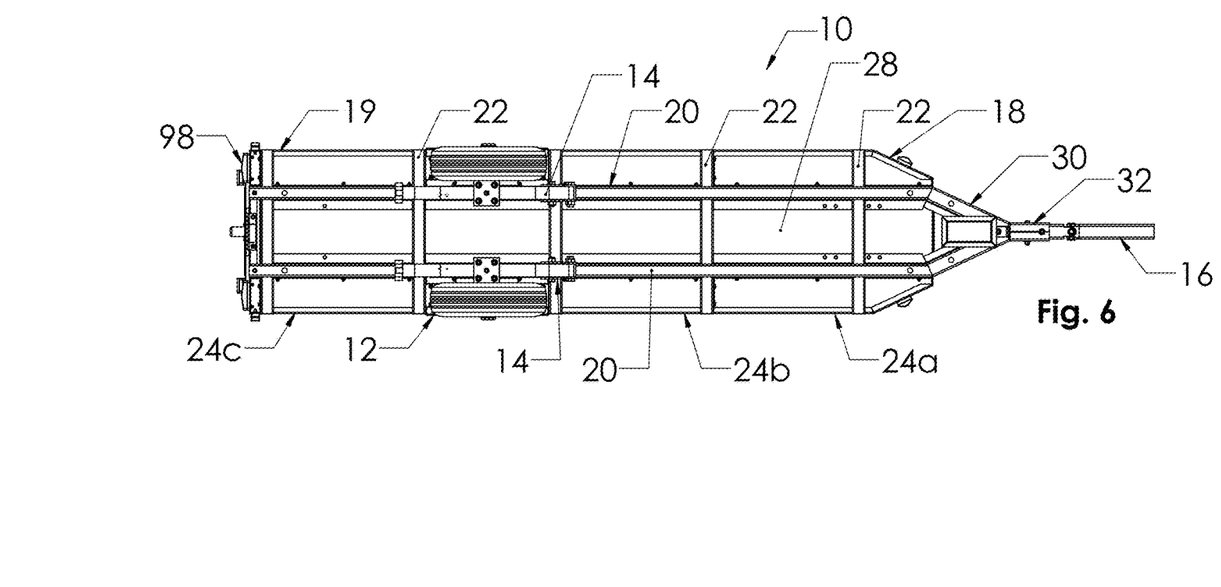
FIG. 6 is a bottom plan view of the trailer.
Figure 7:
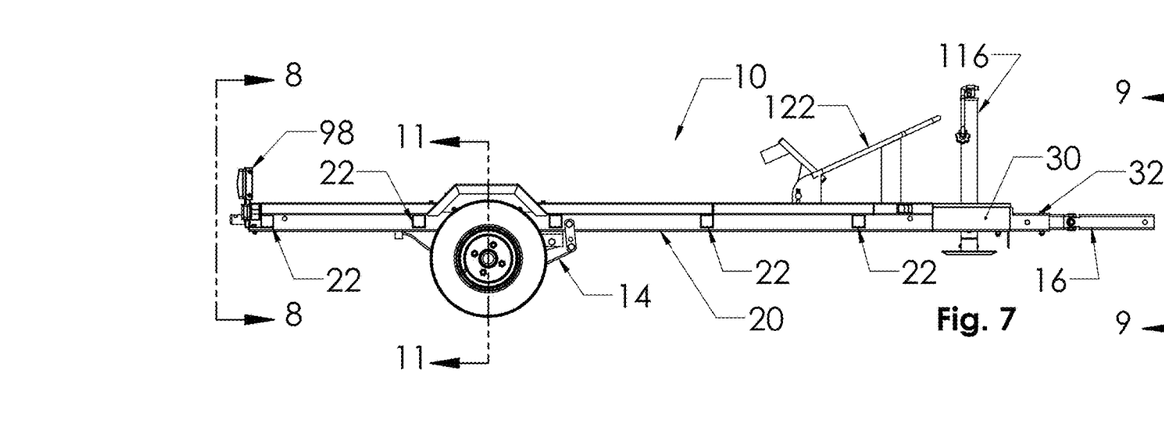
FIG. 7 is a side elevation of the trailer with the jack in retracted position.
Figure 8:
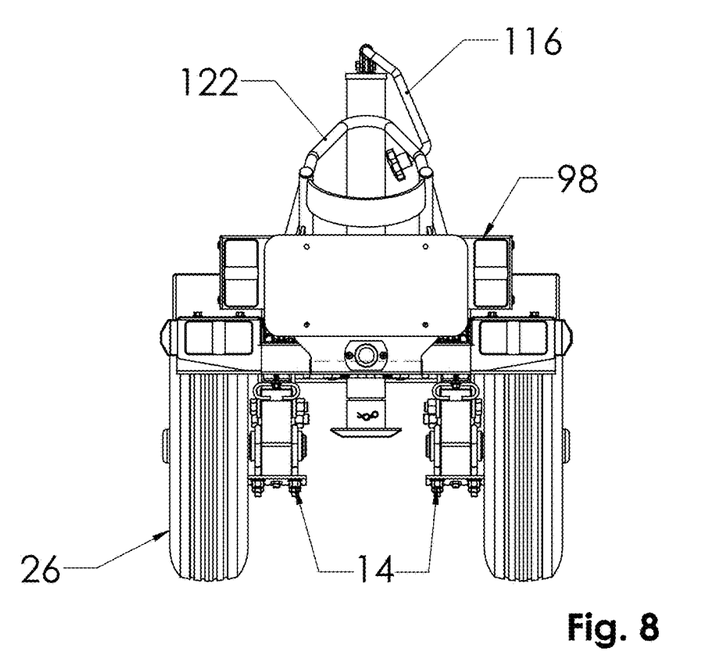
FIG. 8 is a rear elevation of the trailer taken along the plane 8-8 in FIG. 7 with an end gate in closed position.
Figure 9:
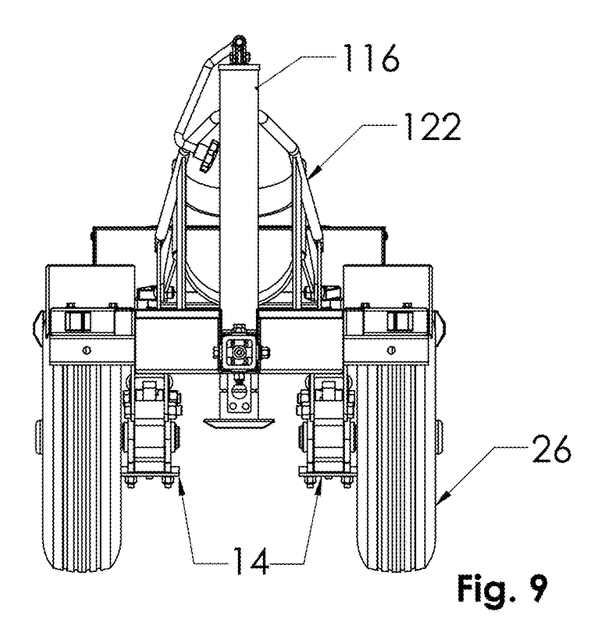
FIG. 9 is a front elevation of the trailer taken along the plane 9-9 in FIG. 7.

Referring to the drawings more particularly by reference character, reference numeral 10 identifies a stabilized two-wheeled trailer in accordance with the present invention. In major part, trailer 10 includes a chassis 12 (FIG. 6), a leaf spring suspension 14 and a universal joint coupling 16 as described below. Trailer 10 is particularly useful for transporting a motorcycle or other power sports recreational vehicle such as a small ATV, personal water craft such as jet skis and outdoor recreational equipment such as bicycles, canoes, kayaks, camping gear and like which have small total weight.

Figure 3:
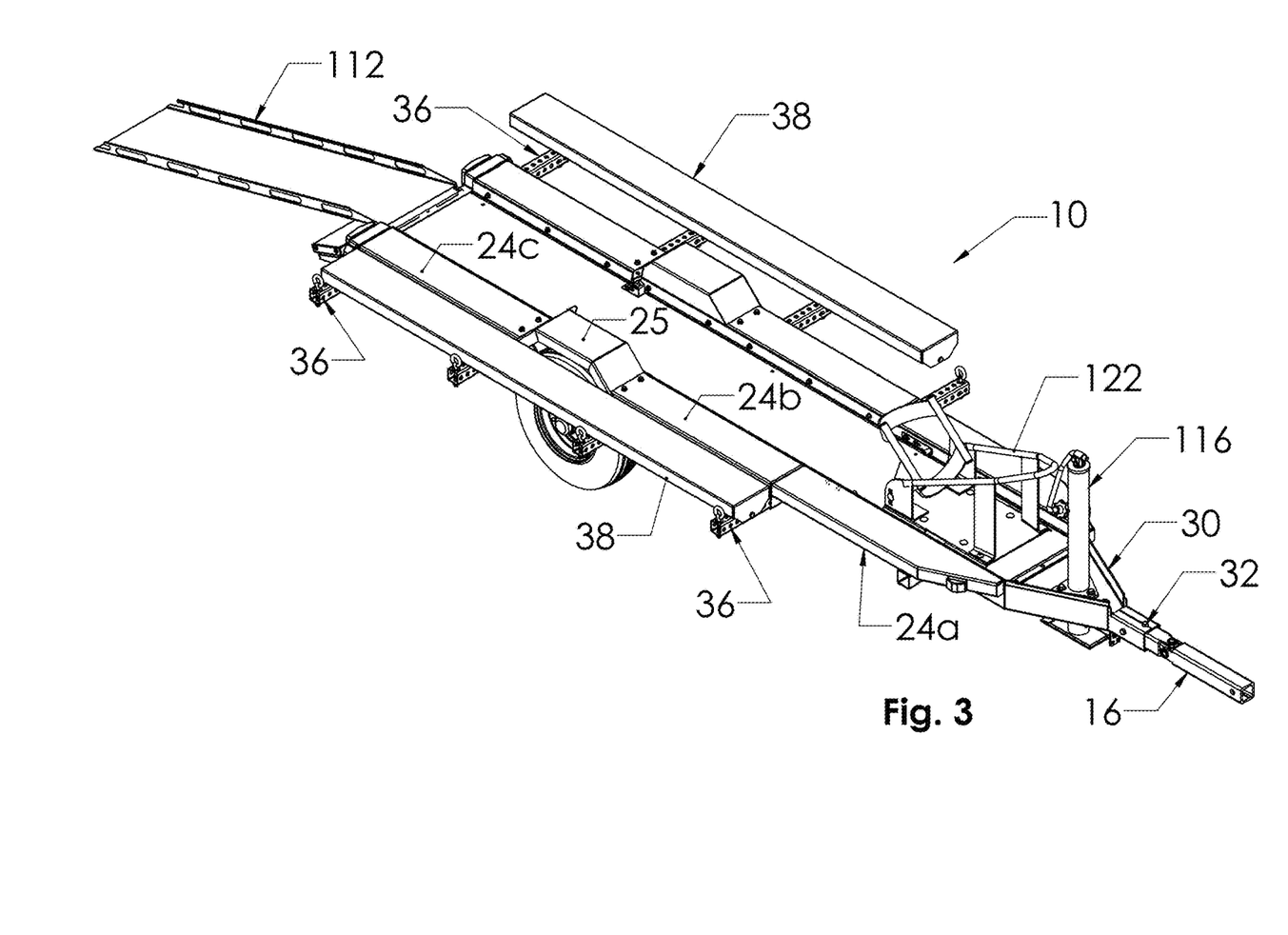
FIG. 3 is a perspective view of the trailer with a loading ramp shown ready for use in loading a motorcycle or the like and with one of the optional side plates shown exploded from the optional outriggers.

Chassis 12 is a generally rectangular shaped integral frame with a forward end 18 and a rearward end 19. Frame is formed from a pair of spaced apart box beams 20 and a plurality of transverse members 22 which pass through and overhang the spaced apart beams 20. Transverse members 22 are formed of rectangular tubing and are welded to beams 20. Side rails 24 are formed in sections 24a, 24b and 24c welded to beams 20, the forward one of which 24a is tapered while fender section 25 is bolted between sections 24b and 24c to accommodate wheels 26. A platform 28 is welded to side rails 24 between beams 20 and to transverse members 22. A trailer tongue 30 is formed of rectangular tubing and is rigidly secured to forward end 18 of beams 20 to complete the integral frame. A receiver 32 is provided at the forward end of tongue 30 for attaching trailer 10 to a towing vehicle 34 with universal joint coupling 16. Outriggers 36 may be inserted into the outer ends of transverse members 22 upon which side plates 38 may be attached (FIG. 3). Outriggers 36 secured with locking pins also provide load tie down attachment points and attachment points for load pole markers 42.

Figure 19:
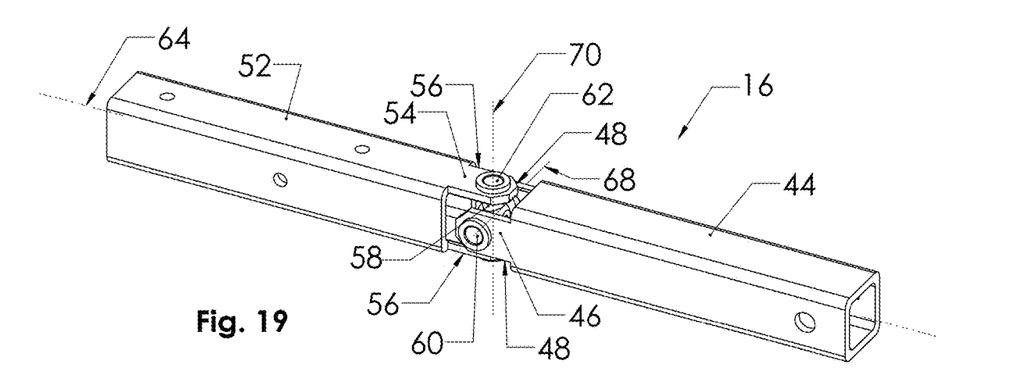

As shown in FIG. 19 universal joint coupling 16 includes a first tubular steel section 44 with a yoke 46 formed by a pair of spaced apart pivot ears 48 at a first end and a second end adapted to be removably coupled to a receiver 50 secured to the frame of a pulling vehicle 34. A second tubular steel section 52 has a yoke 54 formed by a pair of spaced apart pivot ears 56 at a first end and a second end to be removably coupled to receiver 32 in trailer tongue 30. Yokes 46 and 54 are joined to a block 58 with pins 60 and 62 perpendicular to a longitudinal axis 64 of universal joint coupling 16. Universal joint coupling 16 is thus prevented from longitudinal movement in a direction parallel to longitudinal axis 64 and from rotational movement about the longitudinal axis by the coupling of first tubular section 44 in receiver 50. Pins 60 and 62 in block 58 permit second tubular section 52 to rotate about a first 68 and second axis 70 perpendicular to longitudinal axis 64. Trailer 10 attached to tongue 30 is stabilized against lateral rolling or tilting but allows for pitch and yaw angular freedom between towing vehicle 34 and trailer 10.

Figure 10:
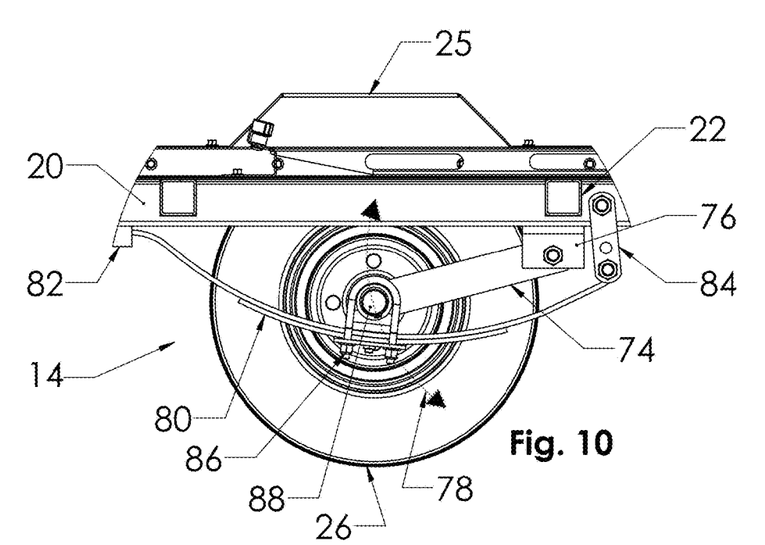
FIG. 10 is a detail on an enlarged scale taken along the line 10-10 in FIG. 5.
Figure 11:
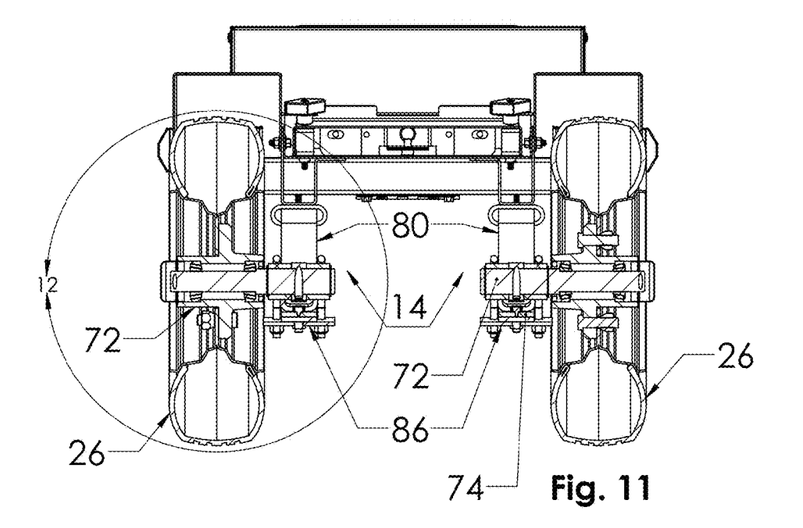
FIG. 11 is a cross section on an enlarged scale taken along the plane 11-11 in FIG. 7.
Figure 12:
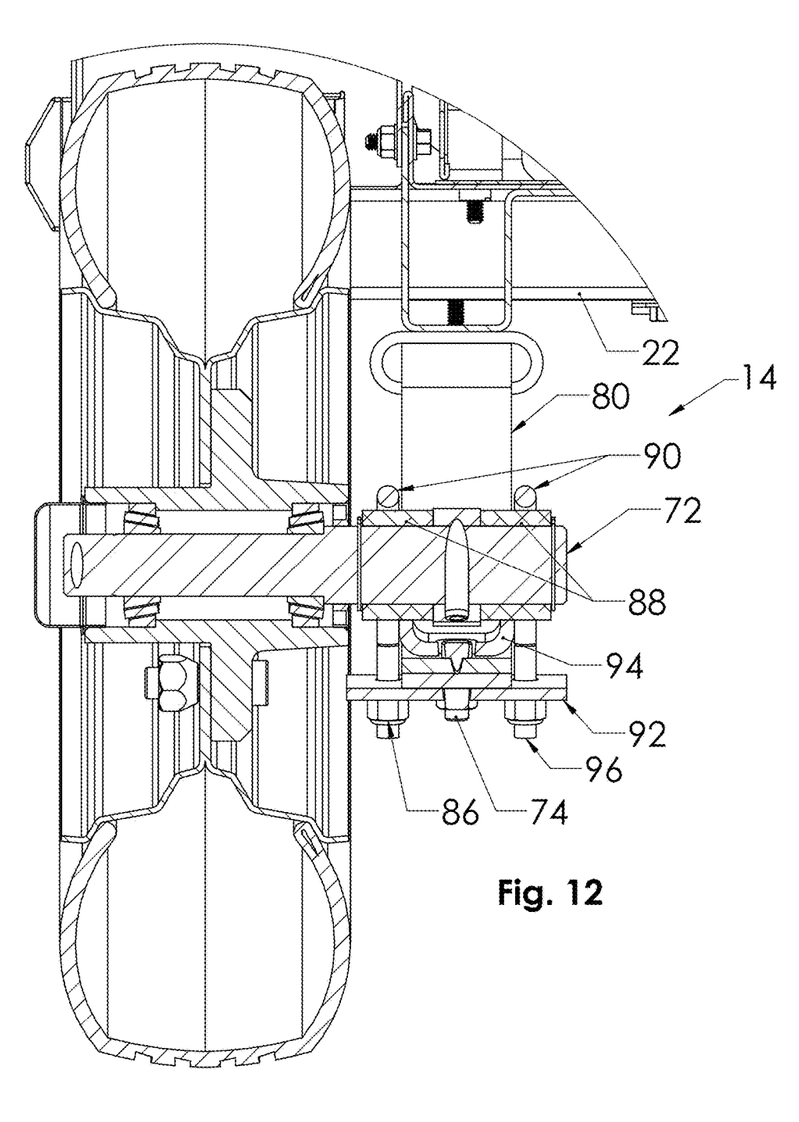
FIG. 12 is a detail on a further enlarged scale taken along the line 12-12 in FIG. 11.
Figure 13:
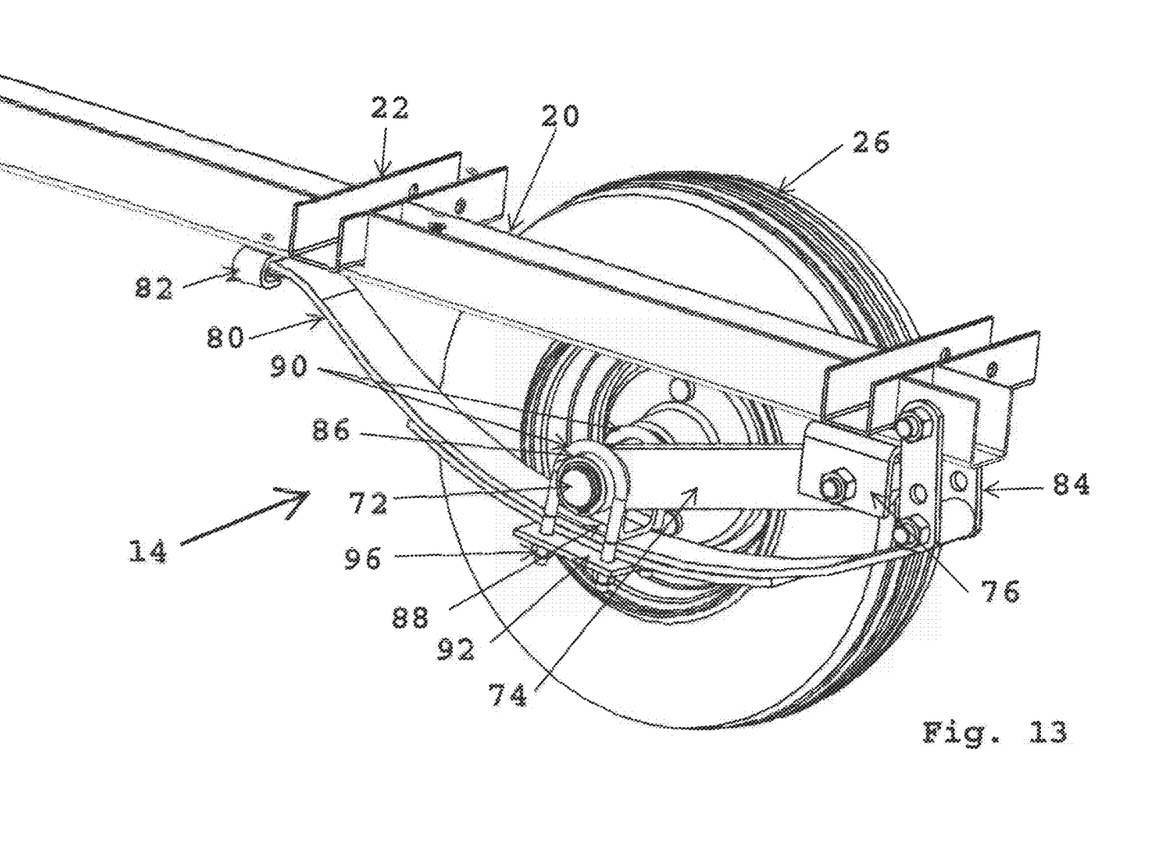
FIG. 13 is a perspective view of the leaf spring suspension shown in FIG. 10 on a further enlarged scale.
Figure 14:
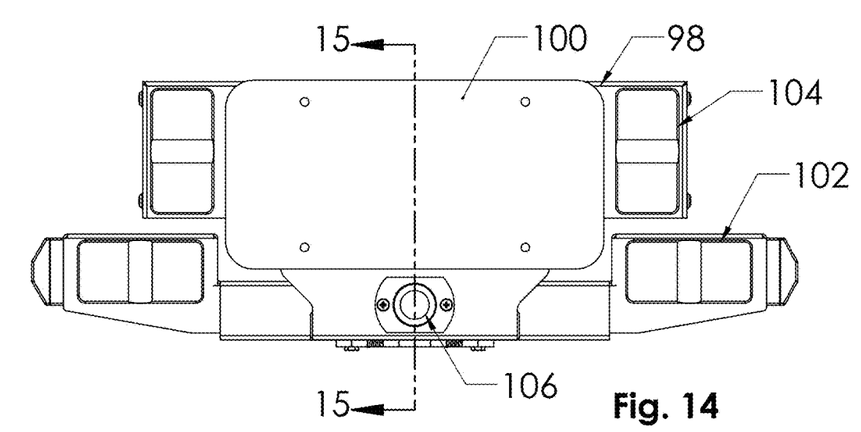
FIG. 14 is a rear elevation of the tail gate.
Figure 15:
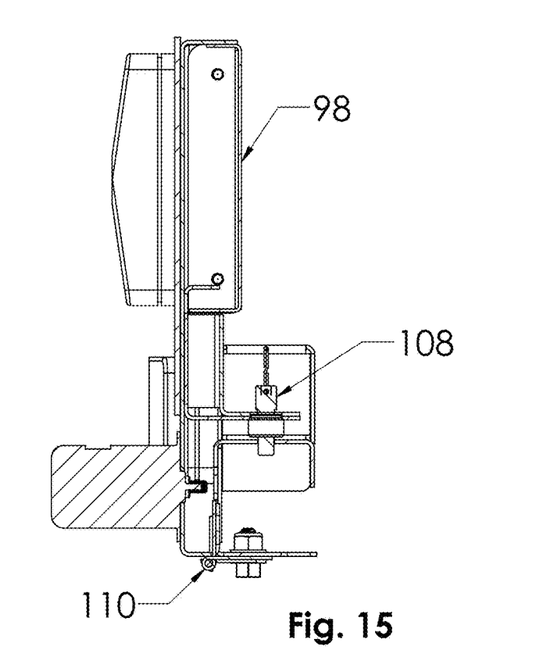
FIG. 15 is a cross section taken along the plane 15-15 in FIG. 14.
Figure 16:
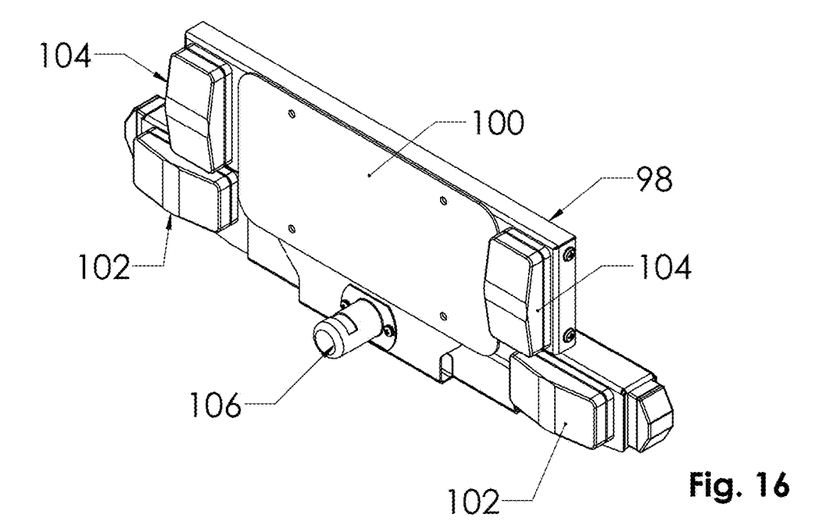
FIG. 16 is a rear perspective view of the tail gate.
Figure 17:
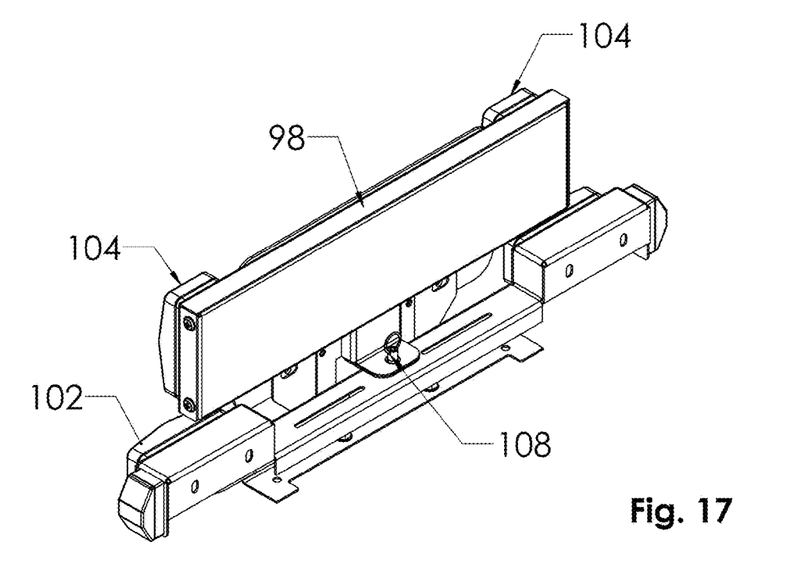
FIG. 17 is a perspective view of the tail gate as viewed from the inside of the trailer.

Each of two wheels 26 is mounted for rolling support of trailer 10 on a split axle 72 to one of beams 20 by leaf spring suspension 14. As best see in FIGS. 10-12, at each side of chassis 12 transversely extending split axle 72 is bolted to an end of an axle arm 74. An opposite end of axle arm 74 is pivoted to beam 20 by means of a U-shaped bracket 76. Axle arm 74 provides a suspension link between axle 72 and beam 20 to control the motion of axle 72 in the longitudinal (fore-aft) direction along an arc 78 (FIG. 10). Axle arm 74 also contributes to roll axis control by deflecting some of the forces as more particularly discussed below.

Each axle 72 is rotatably supported on one of beams 30 by an elongated leaf spring 80. To allow axle 72 to move up and down along arc 78 in response to load variations, leaf spring 80 is mounted on beam 20 such that the leaf spring may lengthen or shorten. To allow leaf spring 80 to lengthen or shorten according to load variations, opposite ends of leaf spring 80 are attached to beam 20 in a manner that the ends are free to move longitudinally on beam 20. In the embodiment shown in the drawings, movement of the rearward end of leaf spring 80 is accommodated with a slipper 82 and movement of the forward end of leaf spring is accommodated with a pivotable shackle 84 but other combinations and connections are possible, e.g., both ends may be mounted with shackles, both ends with slippers or the like.

Leaf spring 80 is rotatably attached to axle 72 with a clamp 86. As shown in the drawings, this may be accomplished with bushings 88 flanking axle arm 74 when clamp 86 comprises U-bolts 90 and a clamping plate 92 between which the leaf spring is sandwiched. A C-shaped spring pad 94 may be provided between the uppermost leaf of leaf spring 80 and clamping plate 92. U-bolts 90 pass through clamping plate 92 and are secured with nuts 96. As nuts 96 are tightened on U-bolts 90, the bight of U-bolts 90 and the fingers of C-shaped spring pad 94 are pressed against bushings 88 such that clamp 86 rotates with bushings 88 on axle 72.

An end gate 98 may be provided at rearward end 19 of chassis 12 for display of a license plate 100 and with tail lights 102, signal lights 104 and a plate light 106 to meet Department of Transportation standards. Electric wires (not shown) may be passed through beams 20 for connection of lights 102, 104 and 106 with towing vehicle 34. End gate 98 is locked in vertical position with a pin lock 108 and is hinged 110 to rearward end 19 chassis such that it may be pivoted out of the way for attachment of a loading ramp 112 as shown in FIG. 3 and more particularly discussed below.

In one embodiment, trailer 10 is 24" wide with a platform 28 having a width of 12" and 6" side rails 24. This permits easy storage in a garage without disassembly as is required with other trailers for hauling a motorcycle 114. As a further space saving feature, a jack 116 may be provided on forward end 18 of chassis such that motorcycle 114 may be stored on trailer 10. If trailer 10 is stored between uses with trailer tongue 30 facing outward, connection of trailer 10 to towing vehicle 34 is facilitated by simply attaching section 44 of universal joint coupling 16 to receiver 50 of towing vehicle 34 and retracting jack 116. The capacity of one embodiment of trailer 10 is between 500 and 800 pounds when wheels 26 are 8"×3.75" but heavier weights may be accommodated with larger tires, a wider wheel base (e.g., 30") and a heavier duty leaf spring 80 while still retaining a narrow gauge low profile.

Figure 1:
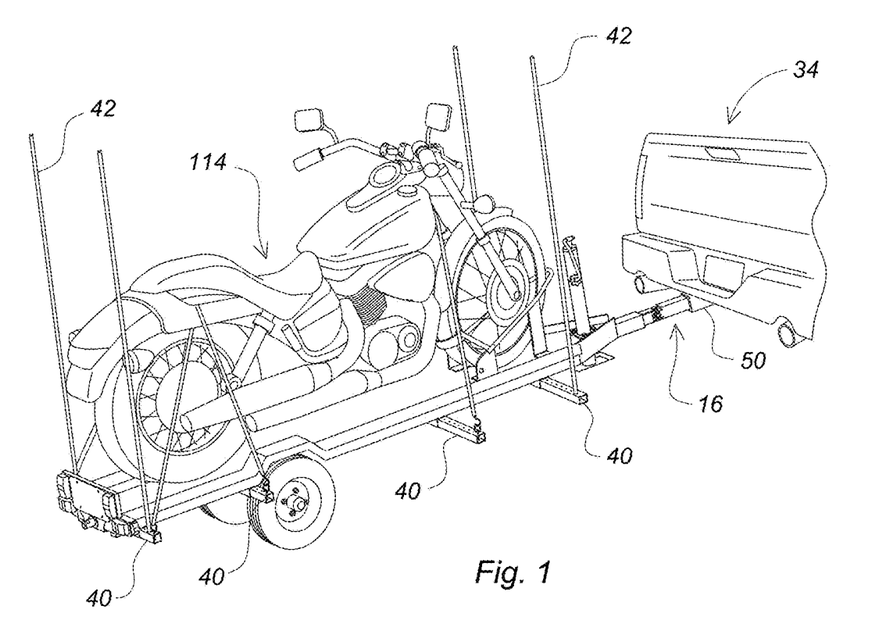
FIG. 1 is a perspective view of a motorcycle loaded on a stabilized two-wheeled trailer attached to a towing vehicle with a universal joint coupling.
Figure 2:
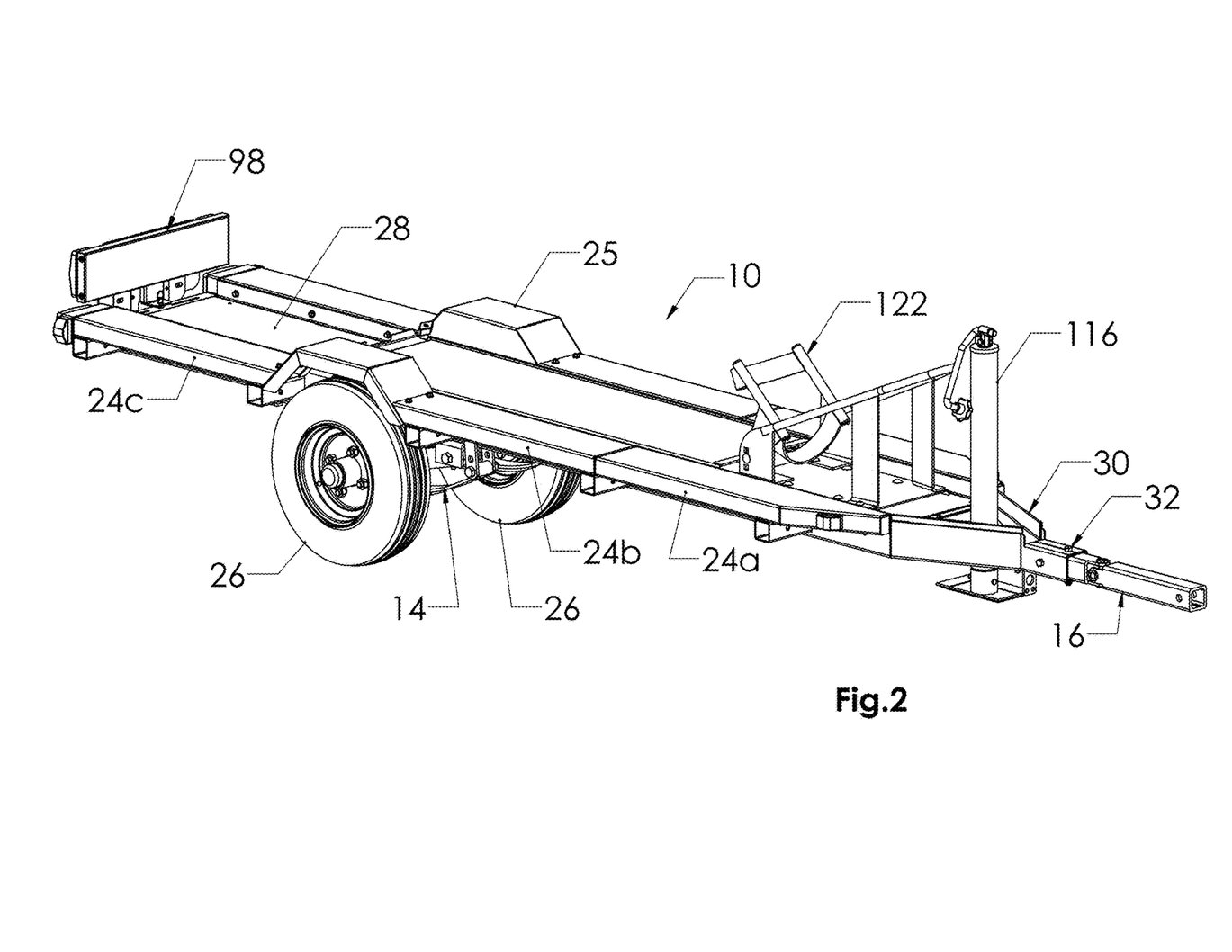
FIG. 2 is a perspective view of the trailer detached from the towing vehicle as viewed from the forward end with the forward end of the trailer supported by a jack.
Figures 4, 5:
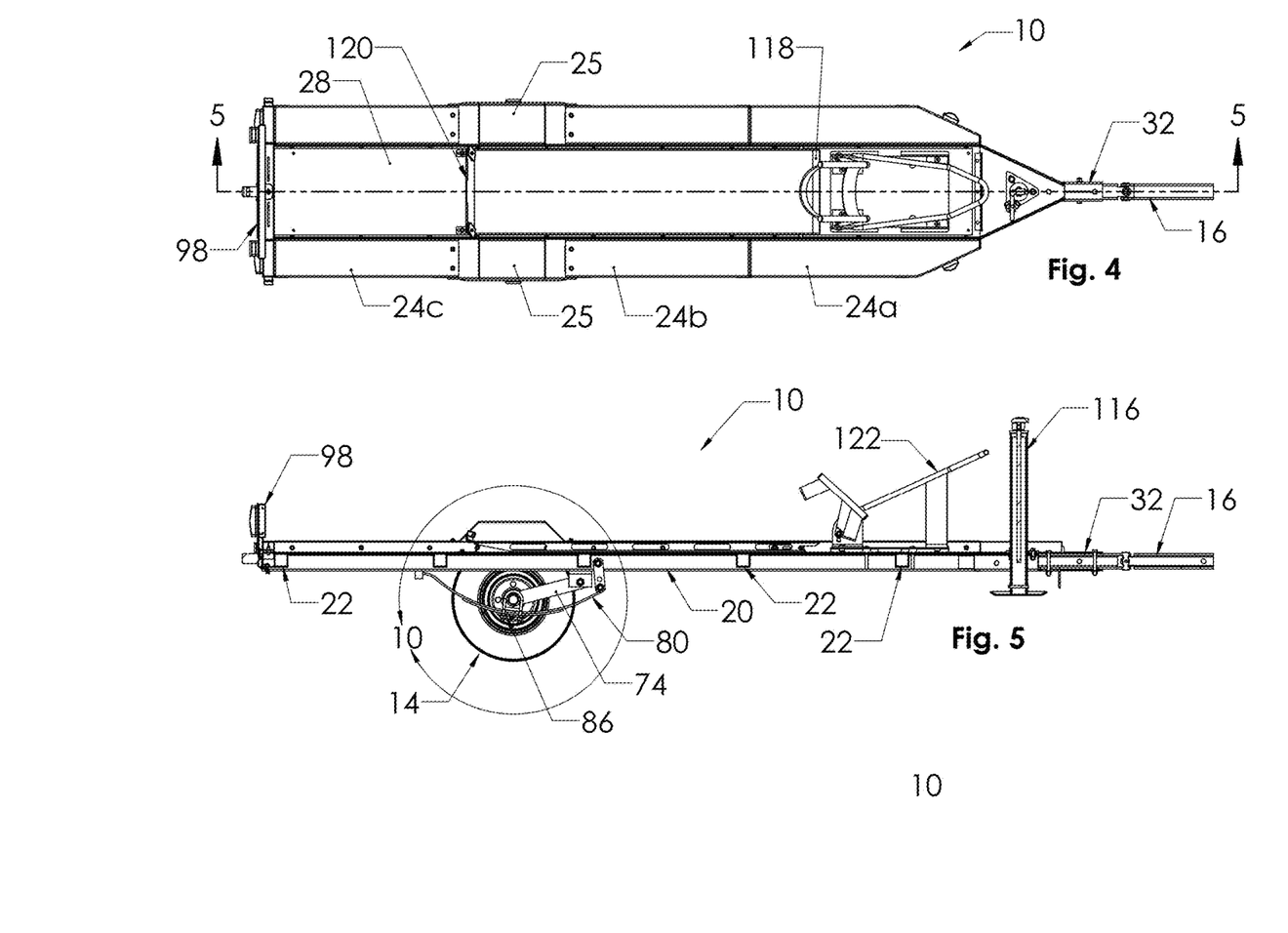
FIG. 4 is a top plan view of the trailer.
FIG. 5 is a cross-section of the trailer taken along the plane of 5-5 in FIG. 4 with the jack in retracted position.

In use, motorcycle 114 as shown in FIG. 1 may be loaded on trailer 10 before or after trailer 10 is hitched to towing vehicle 34. A loading ramp 112 may be provided on platform 28 with a forward 118 and rearward lockdown bracket 120 (FIG. 4) for securing ramp 112 to platform 28. Alternatively, front frame brackets (not shown) may be provided for storing ramp 112 under forward end 18 of chassis 12. With trailer 10 as shown in FIG. 3, two people can easily push motorcycle 114 up ramp 112 and into a front wheel chock 122. Motorcycle 114 may then be secured with tie downs attached to attachment points 40 on outriggers 36 and pole load markers 42 installed. With multiple attachment points 40, various motorcycles with different profiles may be accommodated. Alternatively, a user may ride motorcycle 114 up ramp 112, preferably with side plates 38 having non-slip stair treads installed on outriggers 36 for the user's feet.

Trailer 20 is connected to towing vehicle 34 with universal joint coupling 16 such that the pitch attitude and yaw attitude of trailer 10 are independent and the trailer may the track towing vehicle over the ground. In the embodiment illustrated, sections 44 and 52 of the joint are long enough that a tail gate of towing vehicle 34 may be lowered when trailer 10 is hitched. Sections 44 and 52 are locked together by block 58 to prevent torsional twisting of universal joint coupling 16, thereby exerting a counteracting force to keep trailer 10 vertical. This force as discussed in the Brief Description of the Prior Art section may not be enough to keep a narrow gauge trailer with a tall load from tipping over. With trailer 10 as described herein each wheel 26 is independently supported by leaf spring suspension 14. Leaf spring suspension 14 allows for compensation or balance of the roll axis, as that torque is transmitted into chassis 12. Acting in concert with the resistance provided by universal joint coupling 16, leaf spring suspension 14 stabilizes narrow gauge trailer 10 from tipping with a tall load such as motorcycle 114.

Figure 18:
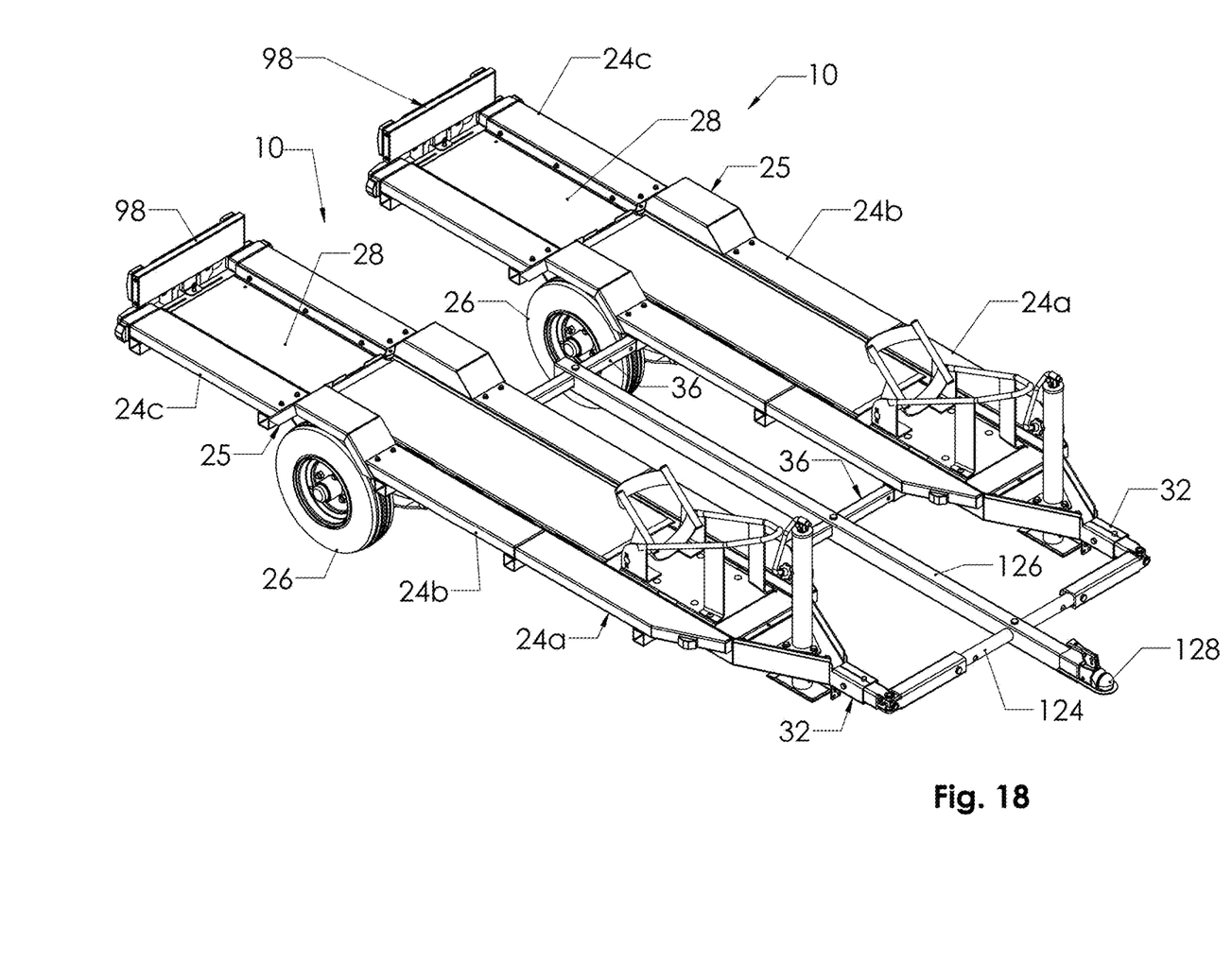
FIG. 18 is a perspective view of a pair of trailers linked together by outriggers and wherein a singletree connects the tongues with a ball hitch; and, FIG. 19 is a perspective view of the universal joint coupling.

As shown in FIG. 18, elongated outriggers 36 may be used to link two trailers 10 side-by-side with a singletree 124 connecting receiver 32 on each trailer. A center pull bar 126 terminating with a ball hitch 128 is connected to outriggers 36 and singletree 124. Leaf spring suspension 14 provides for a softer ride and the combination of universal joint coupling 16 and leaf spring suspension 14 is not required as the combination of two trailers has the roll-resistance of an ordinary flat bed. Hence ball hitch 128 may be used in place of universal joint coupling 16.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

What is claimed:

1. A stabilized two-wheeled trailer comprising
   an integral frame said frame having first and second spaced apart elongate beams and transverse members which pass through, are welded to and overhang the beams, side rails welded to the beams and a platform welded to the side rails between the beams and to the transverse members, a tongue welded to a forward end of beams;
   an axle of a first wheel mounted on a first axle arm pivoted to the first elongate beam and an axle of a second wheel mounted on a second axle arm pivoted to the second elongate beam, a leaf spring rotatably attached by a clamp to each axle, each leaf spring configured to lengthen or shorten according to load variations as the axles move up and down along an arc while lateral roll forces on the trailer are absorbed by the axle arms.

2. A two-wheeled trailer having a frame with first and second elongate beams and a tongue with a first receiver, said trailer stabilized with a leaf-spring suspension and with a joint coupling,
   said leaf spring suspension comprising an axle of a first wheel bolted on a first axle arm pivoted to the first elongate beam and an axle of a second wheel bolted on a second axle arm pivoted to the second elongate beam, each of said axles journaled in first and second bushings flanking each of the first and second axle arms, a leaf spring suspended on the first and second bushings by a clamp that straddles the leaf spring, each leaf spring configured to lengthen or shorten according to load variations as the axles move up and down along an arc, said axle arms resisting lateral roll forces; and,
   said joint coupling comprising a first tubular section with a yoke formed by a pair of spaced apart pivot ears at a first end and a second end adapted to be removably coupled to a second receiver secured to a frame of a pulling vehicle, a second tubular section with a yoke formed by a pair of spaced apart pivot ears at a first end and a second end adapted to be removably coupled to the receiver in the tongue, a block by which the yoke of the first tubular section is joined to the yoke of the second tubular section with a first generally horizontal pin in the pivot ears of the first tubular section transverse to a longitudinal axis of the joint coupling and a second generally vertical pin in the pivot ears of the second tubular section perpendicular to the longitudinal axis of the joint coupling;
   whereby said axle arms in the leaf spring suspension and said first tubular section in the joint coupling work in concert to resist lateral roll forces on the trailer while said first and second yokes in the joint coupling permit pitch and yaw annular freedom between a pulling vehicle and the trailer.

3. The trailer of claim 2 wherein the frame is integral and the beams are tubular with tubular transverse members which pass through, are welded to and overhang the beams, side rails welded to the beams and a platform welded to the side rails between the beams.

4. The trailer of claim 3 wherein outriggers are inserted into outer ends of the transverse members for attachment of side plates or for use as tie down attachment points.

5. The trailer of claim 3 wherein attachment brackets are provided on the platform for attachment of a detachable ramp for use in loading a motorcycle on the trailer.

6. The trailer of claim 3 further comprising a hinged end gate at a rearward end of the frame with tail lights, signal lights and a plate light connected to a towing vehicle with electrical wiring passing through one of the elongate beams.

* * * * *